United States Patent [19]
Kadohiro et al.

[11] Patent Number: 5,780,735
[45] Date of Patent: Jul. 14, 1998

[54] AIR FLOW RATE MEASUREMENT APPARATUS

[75] Inventors: Takashi Kadohiro, Hitachinaka; Shinya Igarashi, Naka-machi; Tadao Suzuki, Hitachi; Mamoru Tsumagari, Minori-machi; Takayuki Saito, Hitachinaka, all of Japan

[73] Assignees: Hitachi, Ltd.; Hitachi Car Engineering Co., Ltd., both of Japan

[21] Appl. No.: 602,163

[22] Filed: Feb. 15, 1996

[30] Foreign Application Priority Data

Feb. 15, 1995 [JP] Japan ................ 7-026442

[51] Int. Cl.$^6$ ........................ G01F 1/68
[52] U.S. Cl. ........................... 73/202.5
[58] Field of Search ............... 73/202.5, 202, 73/204.16, 204.11

[56] References Cited

U.S. PATENT DOCUMENTS

| | | | |
|---|---|---|---|
| 3,196,679 | 7/1965 | Howland | 73/204.11 |
| 4,276,773 | 7/1981 | Kawai et al. | 73/204.16 |
| 4,332,165 | 6/1982 | Kawai et al. | 73/204.16 |
| 4,384,484 | 5/1983 | Kohama et al. | 73/204.16 |
| 4,391,132 | 7/1983 | Egami et al. | 73/204.16 |
| 4,403,506 | 9/1983 | Lauterbach | 73/202.5 |
| 4,688,424 | 8/1987 | Hardtmann et al. | 73/204.16 |
| 4,774,833 | 10/1988 | Weibler et al. | 73/204.19 |
| 4,916,948 | 4/1990 | Inada et al. | 73/202.5 |
| 5,381,691 | 1/1995 | Miyazaki et al. | 73/202.5 |
| 5,467,648 | 11/1995 | Igarashi et al. | 73/202.5 |

FOREIGN PATENT DOCUMENTS

561365  9/1993  European Pat. Off. ......... G01F 1/68

*Primary Examiner*—Richard Chilcot
*Assistant Examiner*—Jewel Thompson
*Attorney, Agent, or Firm*—Evenson, McKeown, Edwards & Lenahan, P.L.L.C.

[57] ABSTRACT

Disclosed is an air flow rate measurement apparatus comprising a heating resistor and a temperature sensing resistor for detecting an intake-air flow rate to be sucked into an internal combustion engine, and a circuit module for outputting an electric signal corresponding to said intake air flow rate, said module being electrically connected to said heating resistor and said temperature sensing resistor. The apparatus is featured in that said heating resistor and said temperature sensing resistor are inserted together with an element for measuring an intake air temperature through an opening formed in the wall of an air passage so that said three elements are located in said air passage and the module is fixed to the air passage. The apparatus is of low cost and small sized.

33 Claims, 9 Drawing Sheets

AIR FLOW RATE MEASUREMENT APPARATUS

BACKGROUND OF THE INVENTION

1. Field of the Invention

This invention is related to an air flow rate measurement apparatus, having a function of detecting a temperature of intake air, and more particularly to an air flow rate measurement apparatus useful for automobiles, various industrial apparatus, air conditioning systems and measurements of an intake air flow rate and temperatures for internal-combustion engines.

2. Description of the Prior Art

As is seen in Japanese Patent Laid-open Print No. 60-36916, a conventional air flow rate measurement apparatus is provided with a heating resistor for detecting intake air flow rate and a temperature sensing resistor for compensating temperatures of intake air at an auxiliary air passage. But, the temperature sensing resistor for compensating temperatures of intake air simply functions as an air temperature compensator at the time of the air flow rate detection. In the conventional air flow rate measurement apparatus, there was an example that is provided to the body constituting the main passage with an element for detecting the intake air temperature.

In an air flow rate measurement apparatus in which an auxiliary passage and a module are integrated, it is possible to remarkably reduce the production cost by changing the shape of installation part of the element for measuring the intake air temperature and by improving the precision of intake-air temperature measurement. But, there are the following targets to be achieved in the above technique.

(1) To improve the sealing characteristics between the main passage and the element for measuring the intake air temperature (2) High precision of the intake air temperature measurement (3) No influence by the temperature of outside of the main passage on the element for measuring the intake air temperature (4) No influence by temperatures of the material that covers or supports the element for measuring the intake air temperature the element for measuring the intake air temperature (5) No bad influence by the element for measuring the intake air temperature on the part of the air flow rate measurement

SUMMARY OF THE INVENTION

An object of this invention is to provide an air flow rate measurement apparatus that is used for a system for an engine control unit by sampling an air flow rate and a temperature of intake air inhaled in the engine.

The features of this invention to achieve the above object are as follows.

(1) An element for measuring an air temperature and a heating resistor and a temperature sensing resistor are inserted together through an opening formed in the wall of the opening of an air passage is sealed, said resistors acting as detecting an intake air flow rate in combination (2) A material supporting an element for intake air temperature characteristics, which should have a thickness as small as possible (3) The element for measuring the intake air temperature is disposed closely to the center of the main passage as much as possible and the element is kept away from the wall surface (4) The element for measuring the intake air temperature is installed downstream side than the entrance of an auxiliary passage.

In the air flow rate measurement apparatus that measures an intake-air temperature, the element for measuring an intake-air temperature is installed inside the sealing surface of the module and the main passage. There is formed only one inserting aperture to the main passage. As a result, it is possible to avoid an increase of the number of inserting holes that may lead to reduction of liability and an increase of working steps and the production cost due to increase of the number of components. By integrating a molding material for connectors and the element for measuring intake-air temperature, the distance between the output part for the intake-air flow rate measurement and the output part for the intake-air temperature measurement can be made very small. Therefore, the connectors that are used for the intake flow measurement and the intake-air temperature measurement can be united as a 4 pins connector or a 5 pins connector.

In installing the air flow rate measurement apparatus to automobiles, wiring for electrically connecting the connectors and an engine control unit can be united so that the assembling process and the man-hour of layout designing can be reduced. In addition, since there is no need of installing supporting pins for the element for measuring the intake-air temperature in the holder, the shape of the supporting pins can be simplified, and thus it is possible to improve reliability of the apparatus and to reduce the production cost.

An electric connection between the element for measuring the intake-air temperature and the connectors can be attained only with a supporting pins. Therefore, there is not a necessity for a bonding between a base or a substrate with the driving circuit and the supporting pin, resulting in the improvement of the productivity and the quality. By integral molding of the element for measuring the intake-air temperature with the molding resin placed on the bottom of the module, the number of the parts and a man-hour for production can be reduced as same as in the above mentioned connector structure.

In the air flow rate measurement apparatus explained above, an accurate measurement of an intake-air temperature becomes possible by installing the element for measuring the intake-air temperature inside the main passage. Further, the intake-air temperature can be measured more accurately when the element is installed at a central position of the main passage which is remote from the wall surface as much as possible. When the element for measuring the intake-air temperature is installed inside the auxiliary passage, the module that is unified with the auxiliary passage becomes compact, and it is possible to avoid touching and collision between the main passage and the module, which occurs at the time of installing them.

In order to increase the detecting precision of the element for measuring the intake-air temperature, a thickness of the member covering the element may be made small. On this occasion, there must be thought about the strength of the supporting member which supports the element for measuring intake-air temperature. To cope with the above mentioned point, the tip or the intermediate point of the supporting member of the element for measuring intake-air temperature is inserted into, adhered to or stacked to an aperture having the auxiliary passage and formed in a protector. The neck portion of the supporting member for the intake-air temperature measurement element is adhered to or stacked to the supporting pin.

If the intake-air temperature measurement element is installed in the main air passage, the detecting precision by the intake-air temperature measurement element can be improved, because the element can be placed more remotely from the wall surface of the auxiliary passage. In addition, when the intake-air temperature measurement element is disposed perpendicularly to the air flow direction of the main passage, the response time and the detecting precision of the intake-air temperature element can be improved, because of an increase of an area of the surface to be exposed to intake-air so that the quantity of heat radiation increases.

When the intake-air temperature measurement element is disposed to a base holder so that the element is located at an upper side of the air stream in the main passage, the similar results mentioned above are expected. When the intake-air temperature measurement element is disposed to the protector with the auxiliary passage and is electrically connected to the supporting member formed to the base holder or to the supporting member installed in the connector of the intake-air temperature measurement element, it is possible to evade problems such as a tensile, concentrated stress, etc., which occur when welding or soldering of the element to the supporting member.

In this invention, an auxiliary passage in the intake-air passage is necessary for securing the reliability of the air flow rate measurement apparatus. Especially, in the case where the apparatus is installed in the suction system of a vehicle, there is a danger that the heating resistor, etc. are damaged by an occurrence of back flow, back fire, etc. The intake-air temperature measurement element has almost no problem when it is coated with a resin or glass molding. If the element is exposed to air so as to improve its characteristics, it may be desirable to install the intake-air temperature measurement element to the auxiliary passage.

When the module of the air flow rate measurement apparatus is inserted into the main passage, a seal for the main passage becomes necessary. The perfect prevention of air leakage is achieved by a seal such as an adhesive, packing material, especially O rings, etc. At the same time, the sealing improves precision and the reliability of the air flow rate measurement apparatus. When the intake-air temperature measurement element is integrated together with the connector so as to be inserted into the base aperture, the same effects as mentioned above are expected. When an element for detecting an intake-air temperature is electrically connected with a connector, the characteristics and the reliability of the bonding on mass-production can be improved by passing through a drive circuit installed on the module base.

The air flow rate measurement apparatus of the present invention has a function for measuring the intake-air temperature unlike the conventional one. The range for installing the air flow rate measurement apparatus is expanded greatly by integrating the auxiliary passage to the module side. Moreover, the transmission control system is installed with high precision and low price. Besides the element for measuring intake air temperature, when an element for measuring an ambient temperature is disposed closely to the circuit module and output signals and when inputs from the element for measuring air temperature and outputs from the element for measuring the ambient temperature are input into a control unit such as an engine control unit, for example in case of an automobile, temperature characteristics of the air flow rate measurement apparatus, especially wall temperature characteristics as well as detecting the intake air temperature can be greatly improved.

A temperature difference between the circuit module and the air flow rate measurement can be detected by subtracting an output signal of the element for detecting the intake-air from an output signal of the element for detecting the ambient temperature. Since a measurement error of the air flow rate measurement apparatus is already known, an error due to temperature difference is greatly reduced. On this occasion, the temperature difference between the circuit module and the measuring point of the air flow rate can be indicated without covering a temperature by an output signal, when both the intake-air temperature measuring element and the ambient temperature measuring element are of the same kind or have the same specification. As a result, the control program or the circuit of the air flow measurement can be simplified.

The connector can be integrated by molding the output terminal of the element for detecting the ambient temperature together with the terminal for detecting the air flow rate, whereby the number of harnesses is reduced to lower the production cost. The productivity can be improved when installing the element for detecting the ambient temperature on the substrate of the drive circuit. The air flow rate measurement apparatus of this invention can be installed anywhere of a body forming a throttle valve, an air-cleaner, a duct of a suction system of an automobile, when it is installed as the suction system. Thus, the apparatus is a versatile product for installment.

By installing the ambient air temperature measuring element to the circuit module having the auxiliary passage (hereinafter referred to as a bypass molding), it is possible to install the intake-air temperature measuring element without loosing features and advantages of the conventional air flow rate measurement apparatus. The trend that proceeds lessening the weight of parts can be further proceeded. Accordingly, because there is not a necessity of installing the auxiliary passage to the intake-air passage so that the shape of the passage body can be simplified, a cost reduction of parts can also be progressed.

DETAILED DESCRIPTION OF PREFERRED EMBODIMENTS

Figure 1:
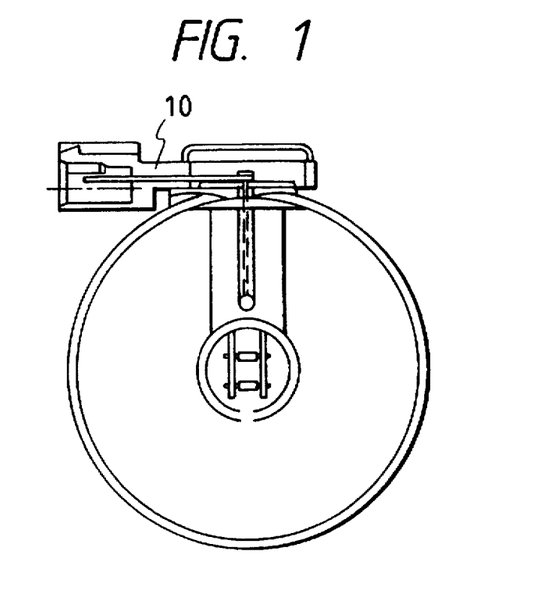
FIG. 1 shows an example of an air flow rate measurement apparatus of this invention.
Figure 2:
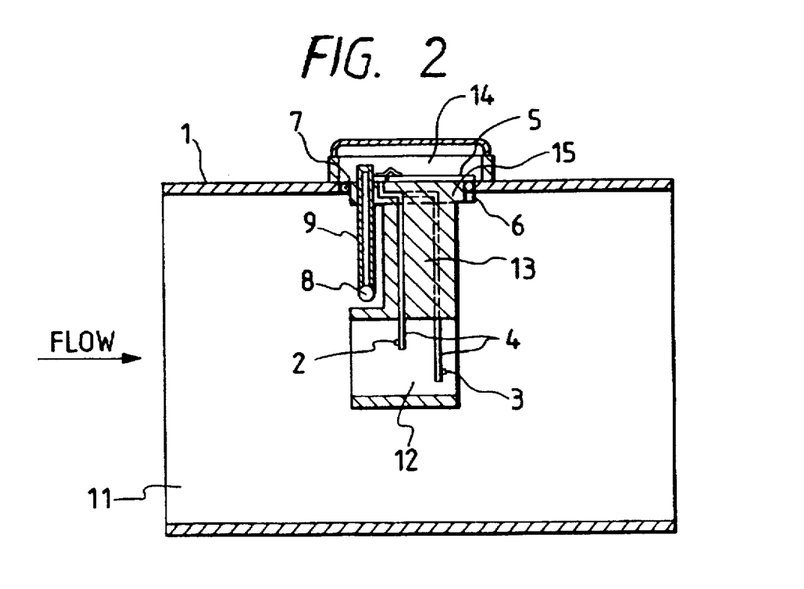
FIG. 2 is an elevated cross sectional view of the element shown in FIG. 1.

Examples of this invention are explained in the following by using FIG. 1–FIG. 14 . FIG. 1 is an example of the air flow rate measurement apparatus of this invention. FIG. 2 is an elevated cross sectional view of the apparatus shown in FIG. 1.

An inserting aperture 6 is formed in body 1 that constitutes the main passage for passing intake air. Inserted through the aperture 6 is a module 14 comprising an intake-air rate measurement 2, a temperature sensing resistor 3, a driving circuit 5 for controlling outputs of the air flow rate measurement apparatus by electric signals of the heating resistor 2 and temperature sensing resistor 3 and a supporting pin 4 for electrically connecting heating resistor 2, temperature sensing resistor 3 and driving circuit 5. An intake our temperature measuring element 8 such as a thermistor, resistor, heating resistor, thermocouple etc., which can measure an intake-air temperature, (hereinafter referred to as thermistor 8) is disposed to a conventional air-flow rate measurement apparatus that has a sealing structure for sealing an outer passage and the main passage 1 with an O-ring 7, packing material, adhesive, sticking, etc. According to this structure, the thermistor 8 can measure not only an intake-air temperature but also an intake air flow rate. The location of the thermistor supporting member 9 for supporting thermistor 8 is inside of the O-ring 7 for sealing between the body 1 and the module 14.

The productivity and the reliability of the products can be improved, because the sealing surface between body 1 and module 14 is located in one place by disposing the thermistor supporting portion 9 inside the O-ring and by reducing the number of parts.

The number of terminals of housing 10 for molding connectors of the air flow rate measurement apparatus is increased by 1 or 2 to that of the conventional apparatus, and these are molded together after electric connection of the terminals and the connectors with thermistor 8. In this case, the inserting aperture for the thermistor is formed in the substrate 15, which is in contact with the body 1 and is disposed to the bottom of module 14 and touches body 1. The thermistor 8 and the thermistor supporting portion 9 are inserted into the inserting aperture formed in the housing 10. While the sealing between the thermistor inserting aperture and the thermistor support portion 9 can be assured by the O-ring or packing material, it is advisable to seal them with adhesion or sticking material, taking into consideration reducing the number of parts. When the thermistor 8 and housing 10 are molded into one body, there is no need of separately forming connectors for the intake-air flow rate measurement and the intake-air temperature measurement, which leads to reduction of parts.

Since the module and the sensing resistors become an integral molding, the air flow rate measurement apparatus can be provided at low price. In regard to the structure of the air flow rate measurement apparatus of this invention, it is possible to integrate the module and the sensing portion in the main passage 11 and the holder passage 12. It is also desirable to install the heating resistor 2 and the temperature sensing resistor 3 inside the holder passage 12 so as to protect the heating resistor 2 disposed to the air flow rate measurement apparatus.

When the thermistor 8 is directly exposed in the passage without coating the outer surface of thermistor 8 so as to improve measurement precision of the intake air temperature, the thermistor 8 is preferably installed in the holder passage 12. However, in the case where the thermistor 8 is disposed in the same holder passage as the heating resistor 2 is disposed, it is important to carefully consider that the thermistor 8 should be disposed at a place sufficiently remote from the heating resistor 2 so as not to receive thermal affect from the heating resistor. Concretely, in the case where the thermistor 8 is installed upstream side of the heating resistor 2, it is necessary to dispose thermistor 8 so as not to receive influence of air-turbulence caused by offsetting the disposition position on the heating resistor 2.

When the thermistor 8 is installed downstream side of the heating resistor 2, the heat conduction capacity of the heating resistor is reduced by offsetting the disposition position of the heating resistor 2 or thermistor 8. The above mentioned influences can be reduced by increasing the parallel distance between the disposition positions of the heating resistor 2 and thermistor 8.

Figure 3:
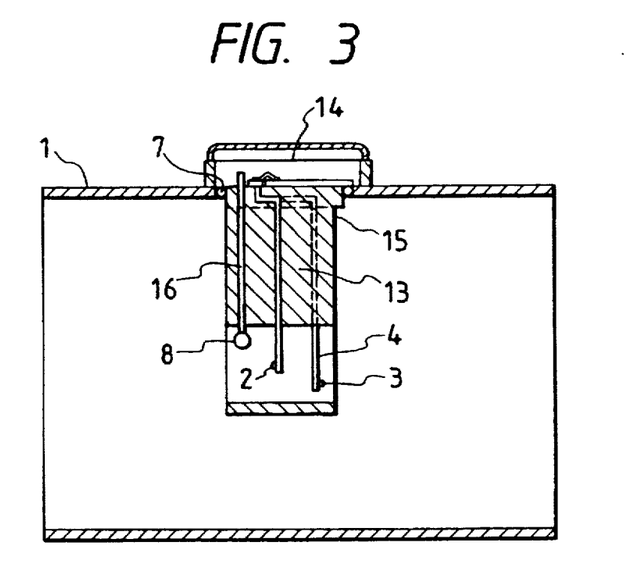
FIG. 3 shows another example of the air flow rate measurement apparatus of the present invention.
Figure 4:
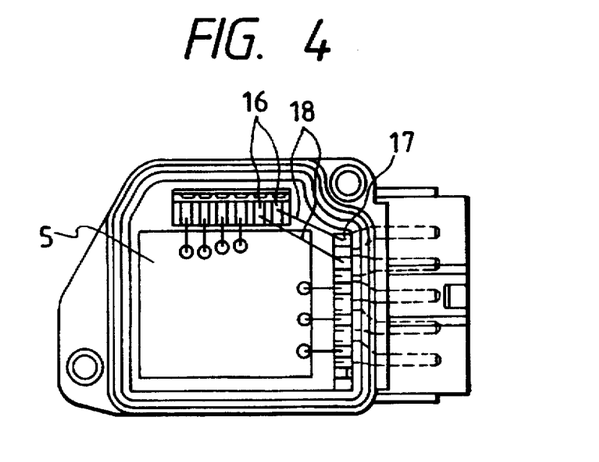
FIG. 4 shows a module of the air flow rate measurement apparatus of the present invention.

FIG. 3 and FIG. 4 show the elevated cross sectional views of the air-flow rate measurement apparatus which are applications of the apparatus shown in FIG. 1 and FIG. 2. The pin 16 supporting the thermistor 8 is molded into one body together with the holder 13 formed in the substrate 15 and constituting a supporting member. Even if the interior of the holder 13 is molded with a resin material or is cavity, there is no problem because of good electric connection. However, if the interior of the holder 13 is void or hollow, the main passage, the holder passage and the above hollow should not be opened to the air so as to avoid the corrosion of the supporting pin. If the above parts are opened, the welding part or the soldering part between the thermistor supporting pin 16 and the thermistor 8 should be put in the molding, and it is necessary to plate the pin with nickel, etc. even if the thermistor supporting pin is made of stainless steel or ferro alloy. The holder 13 is installed inside the seal 7 between the body 1 and the module 14, which are the same structure as that of FIG. 1 and FIG. 2. The output characteristics of the thermistor 8 can be conducted to the connector terminal by electrically connecting the thermistor supporting pin 16 and connector terminal 17 with conductive metal wires such as aluminum, nickel, iron, etc.

By molding the substrate 15 and thermistor 8 into one body, such problems as corrosion and electric current leakage in the parts of welding or soldering can be avoided as same as the integral molding of the housing, thus the reliability can be improved. Since the holder 13 made of resin material can be so designed as being thick and relatively large, the problem such as breakage of the holder does not occur. The resin part of the holder 13 is not thin unlike the thermistor supporting 9. As a result, the reliability of the thermistor supporting portion 9 can be assured. Since the integral molding of the holder 13 and the thermistor 8 is to integrate with the substrate 15, there is no need to arrange the supporting pin 4 and the temperature sensing resistor 3 in the holder supporting. The thermistor supporting portion 9 is disposed to the substrate side as same as in the case as molded with the housing 10. In this case, since the thermistor supporting pin 16 can be welded directly with the connector terminal 17, both the production man-hour and the number of parts are the same as the case of integral molding of housing 10.

Figure 5:
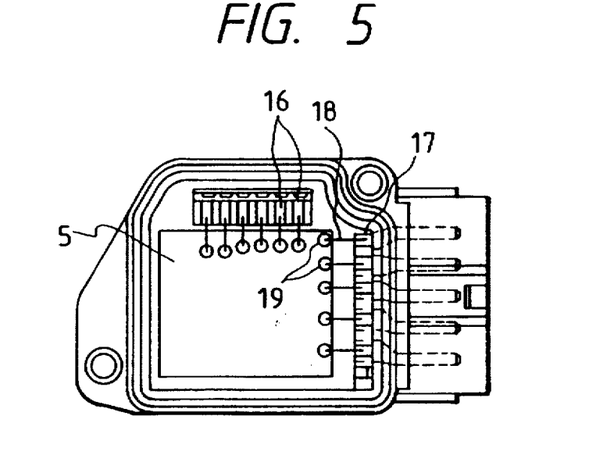
FIG. 5 shows another example of a module of the air flow rate measurement apparatus of the present invention.

FIG. 5 shows the air-flow rate measurement apparatus which is an improvement of the apparatus shown in FIG. 3 and FIG. 4. In this example, the connector terminal 17 and thermistor supporting pin 16 are not directly connected by metal wire 18, but thermistor supporting pin 16 is once connected to driving circuit 5, and then the supporting pin 16 is connected to the connector terminal through a conductive path of the drive circuit 5. By this structure, it is possible to electrically connect the thermistor supporting pin 16 with connector terminal 17 without lengthening a metal wire even if both of them are disposed remotely from each other.

Figure 6:
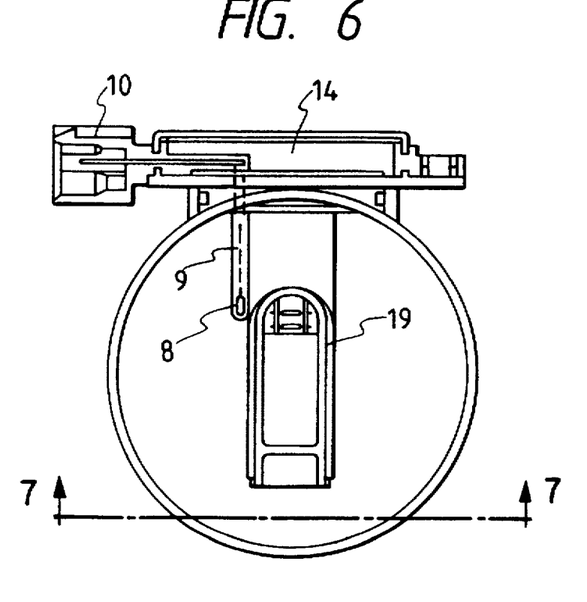
FIG. 6 shows still another example of the air flow rate measurement apparatus of the present invention.
Figure 7:
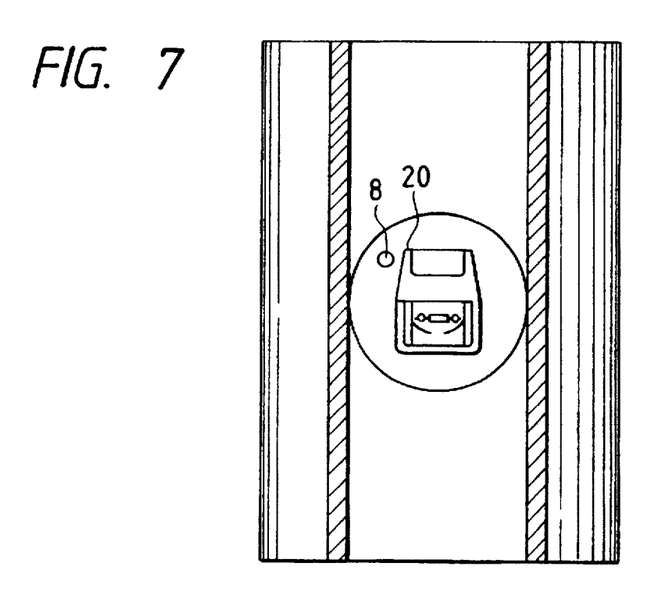
FIG. 7 is the sectional view of the apparatus along with line A—A of FIG. 6.

FIG. 6 shows another improvement of the air-flow rate measurement apparatus shown in FIG. 1 and FIG. 2. To the air-flow rate measurement apparatus in FIG. 6 added is an auxiliary passage component 19 to the module 14 of FIG. 1 and FIG. 2. The main passage 1 can be made a simple cylindrical structure by disposing the auxiliary passage at the side of module 14, thereby to lower its cost. As is explained above, the heating resistor 2 can be protected so that the reliability can be improved. In the case where the auxiliary passage component 19 is used, enlargement of the inserting aperture of the body 1 and the module 14 may be necessary, depending on the size of the auxiliary passage component. When the above inserting aperture is too large, a necessity of enlarging the external size of the module 14 arises, and as a result, the part sizes become necessarily large. At the same time, the precision of the inserting aperture decreases and it becomes difficult to seal with the O-ring in the transverse direction. Under these circumstances, when the O-ring is used, sealing is done at a lower side or packing material, etc. is inserted.

The adhesive and sticking material do not necessarily need high dimensional precision for sealing. In order to make the size of the inserting structure of the module 14 as small as possible, it is desirable to integrate the housing 10 and the thermistor 8 as explained by way of FIG. 1 and FIG. 2. If the thermistor 8 is integrated with housing 10, there is not a necessity of connecting with a metal wire explained above so that the production man-hour can be reduced and the reliability can be further improved. In case of inserting the thermistor into thermistor supporting portion 9 independently, a thickness of the molding becomes thinner, compared with insertion into the holder part 13, and then the heat conduction becomes better. Therefore, the precision of intake-air temperature measurement is improved. According to this structure, products of high precision and low-price can be provided because it can be installed anywhere inside of the sealing part. In addition, by adjustment of the length of the thermistor supporting portion, it is possible to install it so as to locate it in the center of the main passage as close as possible.

When the thermistor 8 is installed downstream than the entrance of the auxiliary passage, the thermistor 8 does not give a bad influence on the heating resistor 2, thereby to promote the stabilization of the output noise and the output characteristics. Therefore, it is effective to dispose the thermistor 8 downstream than the entrance of the auxiliary passage.

Figure 8:
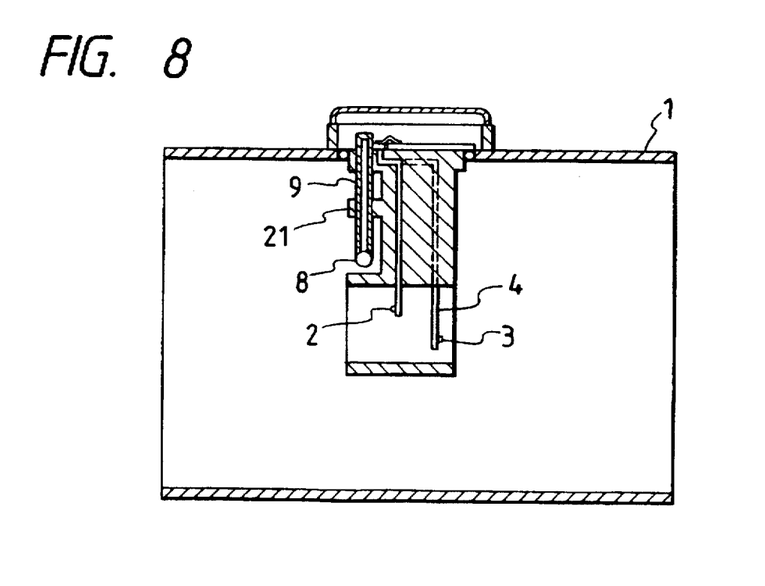
FIGS. 8 to 18 show examples of the air flow rate measurement apparatus of the present invention.

The thickness of the thermistor supporting portion should be made as thin as possible to improve the precision of the thermistor 8. On this occasion, a problem may reside in the strength of the thermistor supporting portion. As is shown in FIG. 8, it is effective that the tip or the intermediate part of the thermistor supporting portion is inserted into a reinforcing aperture and reinforced with an adhesive for the holder 13. When the aperture has such a sectional contour as tapering gradually from the upside to downside, the inserted thermistor supporting portion 9 is calked and reinforced without using an adhesive.

Figure 9:
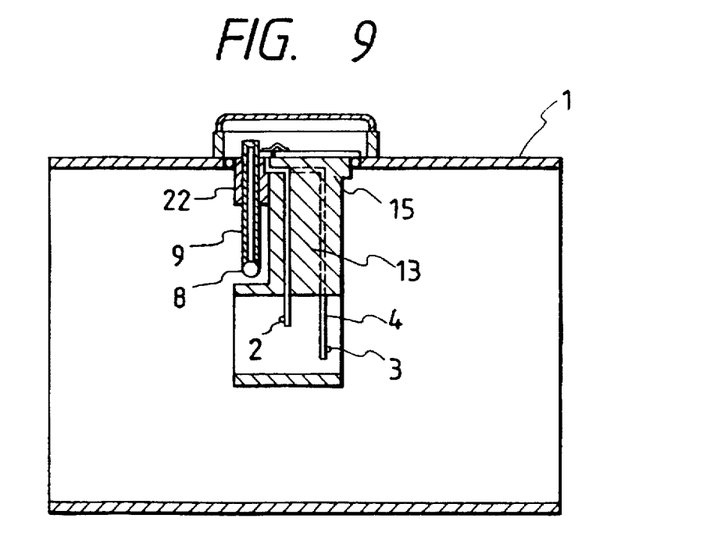

In case of the structure shown in FIG. 8, when the aperture for reinforcement is too close to the tip, heat conductivity of the thermistor 8 lowers and brings about a bad influence on the characteristics. Therefore, it is necessary to make the aperture remote from the thermistor 8 as far as possible. In order to reinforce the thermistor supporting portion as is shown in FIG. 9, a supporting member is disposed at the lower portion of the thermistor inserting aperture of the substrate 15, thereby to increase a contact area between the thermistor supporting portion 9 and the base 15. The inserting method is the same as explained by FIG. 8.

Figure 10:
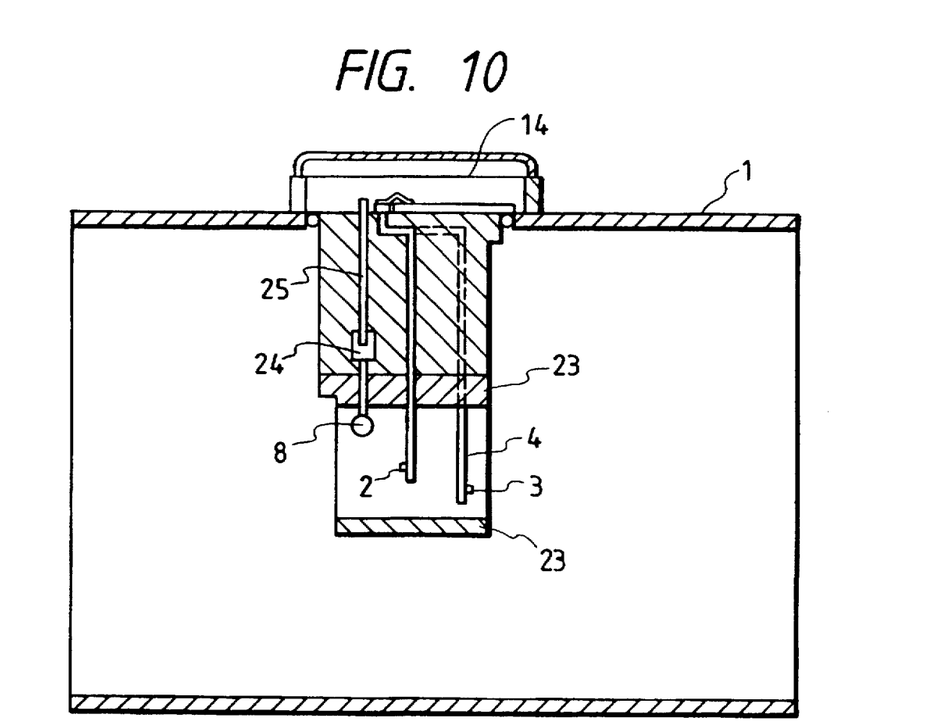

FIG. 10 shows an applied example of the air flow rate measurement apparatus of this invention. Thermistor 8 and protector 23 for forming the auxiliary passage are molded into one body, and the thermistor terminal 24 and supporting pin 25 are connected when assembling the protector 23 to the module 14. Though connection can be done by calking, welding or soldering, etc. may be necessary to secure the reliability. The air flow rate measurement apparatus can be made compact by integral molding of the thermistor 8 and protector 23.

Figure 11:
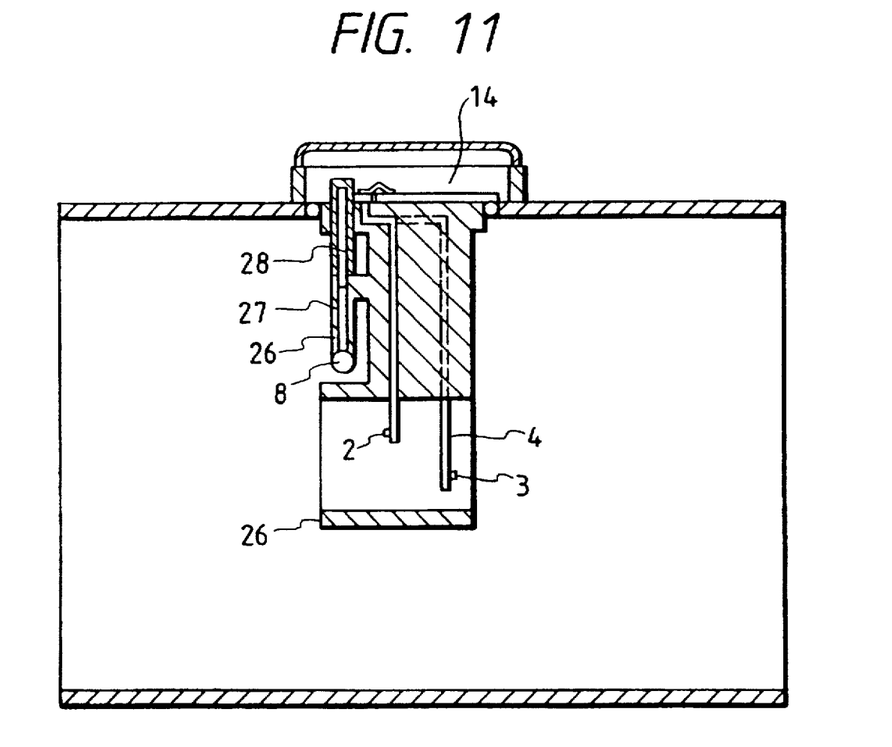
Figure 12:
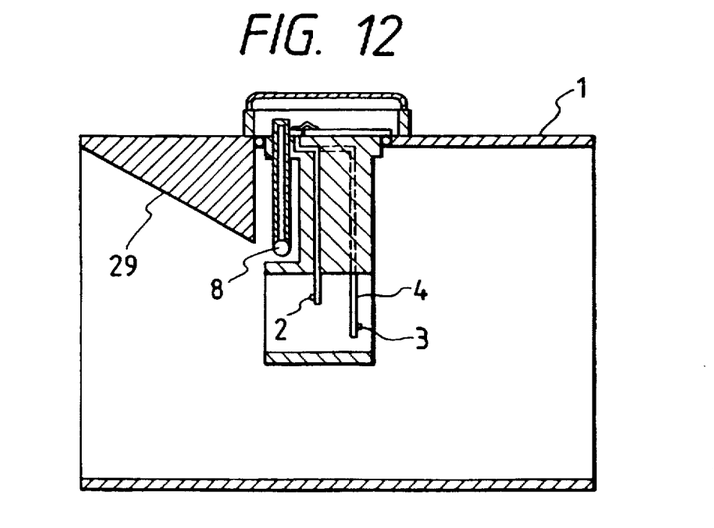
Figure 13:
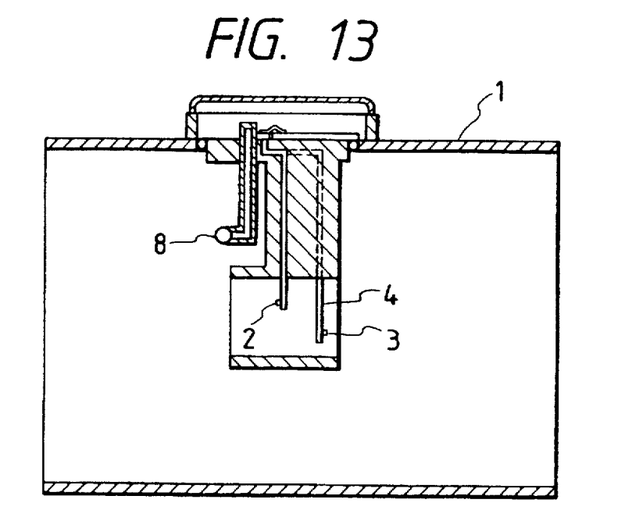

FIG. 11 shows another improvement of the apparatus shown in FIG. 10. In order to dispose the thermistor 8 in the main passage, a connecting part of the supporting pin explained by FIG. 10 is formed at the middle point between the bottom face of the substrate and the central point of the auxiliary passage to locate the thermistor 8 at the protector 26, as similarly in FIG. 10. By this structure, the intake-air temperature can be measured more accurately, compared with the apparatus shown in FIG. 10, because the thermistor 8 is disposed in the main passage. To measure the intake-air temperature more accurately, it is effective to improve the conductivity by forming a throttle shape 29 in the upstream side of the thermistor so that the flow rate in the thermistor is increased as much as possible as shown in FIG. 12. As shown in FIG. 13, the thermistor 8 is disposed in the direction parallel with the air stream thereby to increase the surface area of the thermistor which is in contact with air. As a result, characteristics of the thermistor are improved.

Figure 14:
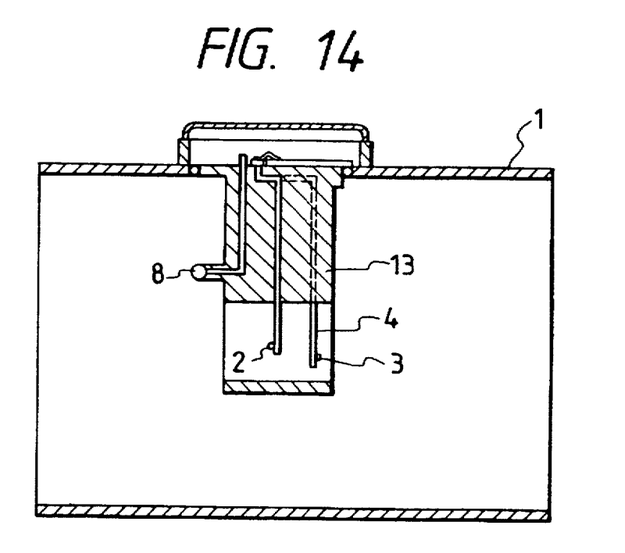

FIG. 14 shows a structure in which the thermistor 8 is protruded from the holder 13 shown in FIG. 13. When the direction of the protrusion is directed towards the air flow, the same results as explained by FIG. 13 will be achieved.

By introducing the air flow rate measurement apparatus with a function, as explained the above into such control systems as internal-combustion engines, air conditioning systems and so on, it is possible to reduce the number of kinds of sensors needed for control of the systems, and also possible to lower the cost, to improve productivity and quality. Since this air flow rate measurement apparatus is provided with the auxiliary passage to the module side, there is no need to prepare the body constituting the main passage explained above. Especially, when it is installed in the intake-air system of vehicles, the apparatus can be composed by inserting it into the intake-air system such as air cleaners, throttle bodies and so on. Since the apparatus is multi-purposed and small sized, assurance of spaces at the time of engine layout designs and design efficiency of the apparatus are improved.

The air flow rate measurement apparatus of this invention is multifunctional, highly accurate and highly reliable.

Figure 15:
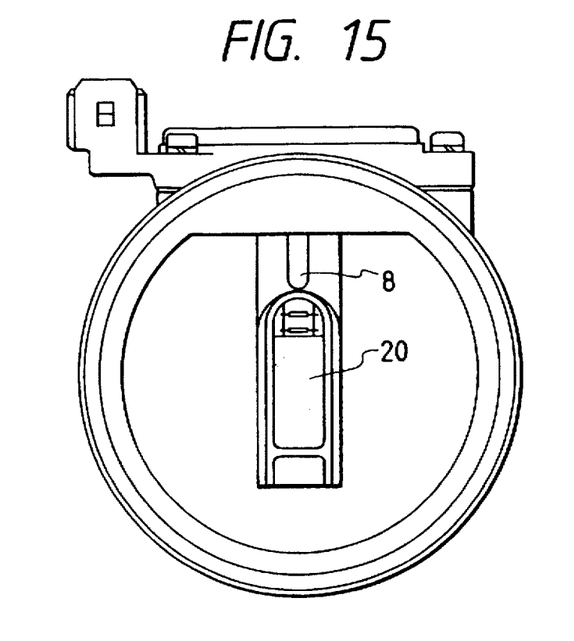
Figure 16:
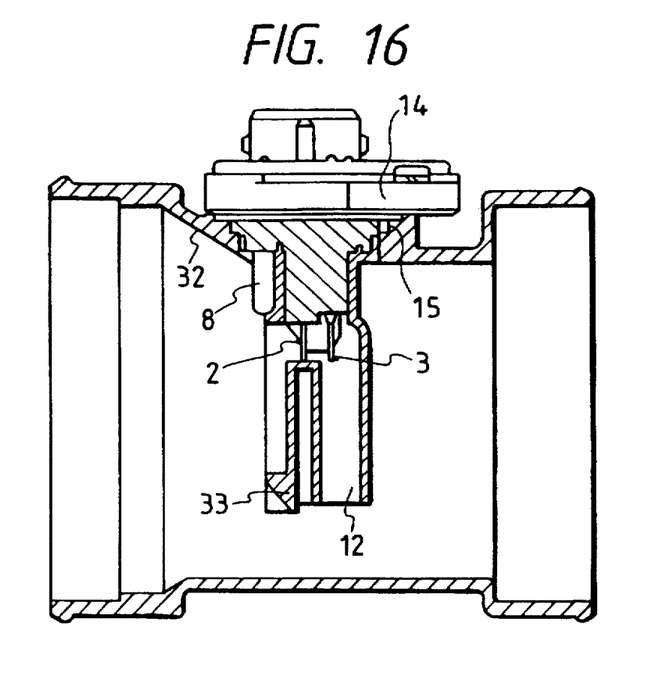
Figure 18:
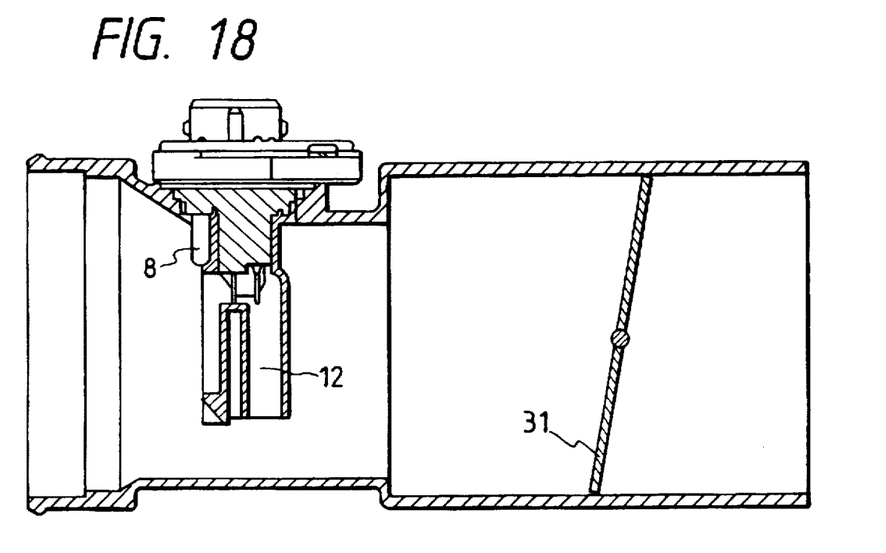

FIG. 15 shows an application example of the air flow rate measurement apparatus of this invention. FIG. 16 shows the elevated cross sectional view of the apparatus of FIG. 15. A protector 33 (hereinafter referred to as a bypass molding) that constitutes the auxiliary passage 12 is integrated with the module 14 by adhesion or sticking. The functions of the air flow rate measurement apparatus are all concentrated on the module, and the apparatus is very small sized products as the air flow rate measurement apparatus. The width from the bottom of the substrate 15 to the upside of the module is very small, therefore it can be installed even if a space is quite small. Since the bypass mold 33 constitutes an auxiliary passage, the apparatus can be installed anywhere of the intake-passage without paying the attention to the influence of the reverse flow that occurs by a pulsation, etc. in the intake-air system. As a result, the apparatus can be integrated with the throttle body shown in FIG. 18, and has a very wide use.

Figure 17:
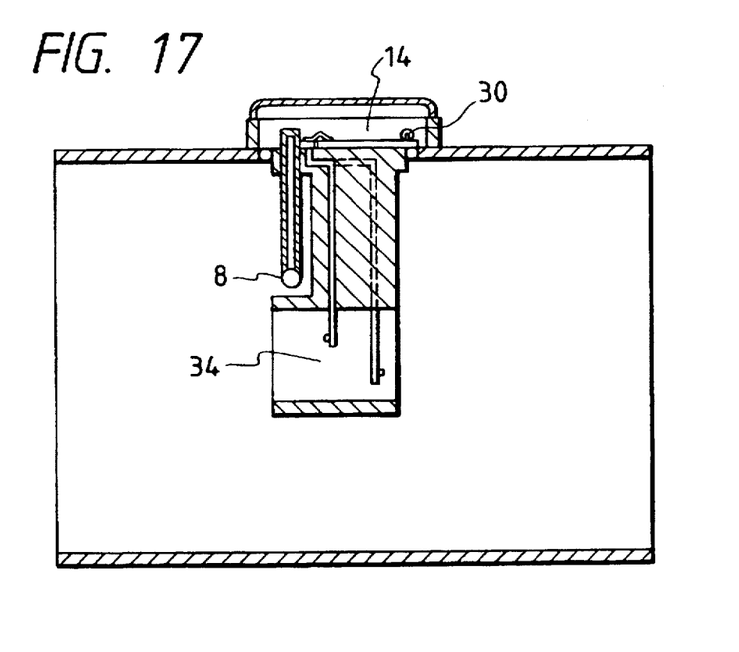

FIG. 17 shows an application example of the air flow rate measurement apparatus of this invention. The intake-air temperature measuring element 8 is installed in the intake-air passage and the element for the ambient temperature measurement 30 is also installed to the module 14. The output signals from the both elements are input into ECU in case of vehicles, and then the signals are subtracted from the output signal from the ambient temperature detecting element 30 to determine the temperature difference between the module 14 and the air temperature measurement 34. By detecting the temperature difference, which may cause an output error in the air flow rate measurement apparatus, the output error of the air flow rate measurement apparatus can be corrected so that precision of the air flow rate measurement apparatus will be assured. When the elements 8, 30 for the intake-air measurement and the ambient temperature measurement are of the same kind or the same specification, the temperature difference can be calculated by ECU, by simply subtracting or adding the output signals without converting it into temperature. By installing the ambient temperature measuring element 33 to the substrate of the driving circuit or by integrating output terminals of the elements for air flow rate, intake-air temperature detecting and ambient temperature detecting, the production cost of the apparatus can be reduced.

According to this invention, air flow rate measurement apparatus of low cost are provided, as well as small sized apparatus. The apparatus are also provided with an element for measuring an intake air temperature and connectors of air flow rate and intake temperature are integrated into one connector so that the air flow rate measurement and intake air temperature can be measured simultaneously.

What is claimed is:

1. An air flow rate measurement apparatus comprising:
   a heating resistor and a temperature sensing resistor for detecting an intake-air flow rate in an internal combustion engine, and
   a circuit module for outputting an electric signal corresponding to said intake air flow rate, said module being electrically connected to said heating resistor and said temperature sensing resistor, characterized in that said heating resistor and said temperature sensing resistor are inserted together with a separate element for measuring an intake air temperature through an opening formed in the wall of an air passage so that said three elements are located in said air passage and the module is fixed to the air passage.

2. The air flow rate measurement apparatus according to claim 1, wherein said circuit module is fixed on the outside wall surface of said air passage.

3. The air flow rate measurement apparatus according to claim 1, wherein said intake-air temperature measuring element is installed to a component that constitutes said circuit module.

4. In an intake-air flow rate measurement apparatus comprising a heating resistor and a temperature sensing resistor for detecting a flow rate of air sucked into an internal combustion engine, and a circuit module for outputting an electric signal corresponding to said flow rate, the improvement wherein an integrated member composed of a supporting member of said heating resistor and said temperature sensing resistor and a supporting member of separate element for measuring the intake air temperature-is inserted through an aperture formed in the wall of an air passage so that said heating resistor, said temperature sensing resistor and said intake air temperature measuring element are located within said air passage.

5. An air flow rate measurement apparatus comprising:
   a heating resistor and a temperature sensing resistor for detecting an intake-air flow rate in an internal-combustion engine, and
   a circuit module for outputting an electric signal corresponding to said air flow rate, said circuit module being electrically connected to said heating resistor and said temperature sensing resistor, characterized in that a terminal for outputting an electric signal from a separate intake air temperature measuring element is fixed to a member for supporting said terminal electrically connecting said heating resistor and said temperature sensing resistor to a driving circuit and that said heating resistor, said temperature sensing resistor and said intake air temperature measuring element are disposed within an air passage.

6. The air flow rate measurement apparatus according to claim 5, wherein an output connector for measuring said intake air flow rate and an output connector for measuring said intake air temperature are integrated.

7. The air flow rate measurement apparatus according to claim 1, wherein said element for measuring the air temperature is molded into a single body together with said connectors.

8. The air flow rate measurement apparatus according to claim 1, wherein said element for measuring the air flow temperature is molded into a single body with a base member disposed on the bottom of said module.

9. The air flow rate measurement apparatus according to claim 1, wherein an auxiliary passage component is formed in a main air passage.

10. The air flow rate measurement apparatus according to claim 1, wherein an auxiliary air passage is integrated with said module.

11. The air flow rate measurement apparatus according to claim 9, wherein said heating resistor, said temperature sensing resistor and said element for measuring the intake-air temperature are installed in said auxiliary passage.

12. The air flow rate measurement apparatus according to claim 9, wherein said heating resistor and said temperature sensing resistor are installed in said auxiliary passage component, and said element for measuring the intake-air temperature is installed inside said main passage.

13. The air flow rate measurement apparatus according to claim 1, wherein said inserting aperture for said air passage is sealed with an O-ring, packing material, an adhesive or a sticking agent.

14. The air flow rate measurement apparatus according to claim 6, wherein structure that the component covers said element for intake-air measurement, after being inserted into said base, by sealing the base aperture end with an O-ring, a packing material, an adhesive or a sticking material.

15. The air flow rate measurement apparatus according to claim 1, wherein said element for measuring air temperature is electrically connected with a connector for outputting signals through said drive circuit.

16. The air flow rate measurement apparatus according to claim 9, wherein said element for measuring air temperature is disposed downstream from an entrance of said auxiliary passage component.

17. The air flow rate measurement apparatus according to claim 1, wherein the tip or middle part of said element for measuring air temperature is fastened to a protector constituting said auxiliary passage of said module.

18. The air flow rate measurement apparatus according to claim 1, wherein a root portion covering said element for measuring air temperature and the bottom surface of said substrate are sealed.

19. The air flow rate measurement apparatus according to claim 9, wherein said element for measuring air temperature is mounted to said protector portion constituting said auxiliary passage component thereby to electrically connect said protector with said holder.

20. The air flow rate measurement apparatus according to claim 9, wherein said element for detecting air temperature is mounted to said protector portion thereby to electrically connect said connector with a supporting pin.

21. The air flow rate measurement apparatus according to claim 1, wherein said element for measuring an intake air temperature has a throttle shape at a position immediately upstream side of the air flow.

22. The air flow rate measurement apparatus according to claim 1, wherein an element for the intake-air temperature measurement is disposed in parallel with the air flow direction of the main passage.

23. The air flow rate measurement apparatus according to claim 8, wherein a supporting pin for electrically connecting the element for measuring intake air temperature and a connector is formed in said, base holder, and said element for measuring intake air temperature is so constituted as to protrude from said holder to the upstream in an air flow direction of said main passage.

24. The air flow rate measurement apparatus according to claim 1, wherein the size of said element for the intake-air temperature measurement is ⅔ or less than said main passage.

25. The air flow rate measurement apparatus according to claim 5, wherein said intake air temperature measuring element and said connector are so molded that only a supporting pin for electrically connecting is protruded from said holder, and said intake air temperature measuring element is welded or soldered.

26. The air flow rate measurement apparatus according to claim 4, wherein said intake air temperature measuring element and said connector are so molded that only a supporting pin for electrically connecting is protruded from said connector, and said intake air temperature measuring element is welded or soldered.

27. The air flow rate measurement apparatus according to claim 1, wherein an element for measuring an ambient temperature is disposed to either one of the inside of said module, the outside of said module or the outside of said intake air passage body.

28. The air flow rate measurement apparatus according to claim 27, wherein said output terminal of said element for measuring ambient temperature is integrated with the output terminal of said element for measuring air flow rate.

29. The air flow rate measurement apparatus according to claim 27, wherein said element for measuring ambient temperature is disposed in said substrate of said drive circuit.

30. The air flow rate measurement apparatus according to claim 27, wherein said element for detecting the intake air temperature has the same specification or the same kind as that of the element for measuring the ambient temperature.

31. The air flow rate measurement apparatus according to claim 27, wherein the control system has a function to correct an error of output characteristics due to temperature difference between said circuit module and said intake-air passage, based on the output signals of said element for the intake-air measurement and said element for ambient temperature measurement.

32. The air flow rate measurement apparatus according to claim 1, wherein said air flow rate measurement apparatus having said intake air temperature detecting element is mounted in a body constituting a throttle valve.

33. The air flow rate measurement apparatus according to claim 1, when said element for measuring air temperature projects from at least one of the upstream side and downstream side of the air passage.

* * * * *